United States Patent
Han et al.

(10) Patent No.: US 9,089,035 B2
(45) Date of Patent: Jul. 21, 2015

(54) ORGANIC LIGHT EMITTING DISPLAY DEVICE INCLUDING TEMPERATURE SENSING UNIT AND METHOD OF DETERMINING AMBIENT TEMPERATURE BASED ON DRIVING VOLTAGE THEREOF

(71) Applicant: Samsung Display Co., Ltd., Yongin (KR)

(72) Inventors: Kyul Han, Yongin (KR); Sang-Woo Pyo, Yongin (KR); Ji-Hwan Yoon, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/196,850

(22) Filed: Mar. 4, 2014

(65) Prior Publication Data
US 2015/0054426 A1 Feb. 26, 2015

(30) Foreign Application Priority Data
Aug. 21, 2013 (KR) .......................... 10-2013-0099244

(51) Int. Cl.
*G09G 3/10* (2006.01)
*H05B 33/08* (2006.01)

(52) U.S. Cl.
CPC .................................. *H05B 33/0896* (2013.01)

(58) Field of Classification Search
USPC .................................... 315/169.3; 257/72, 88
See application file for complete search history.

(56) References Cited

U.S. PATENT DOCUMENTS

| 7,154,494 | B2 | 12/2006 | Kato et al. |
| 2009/0115795 | A1 | 5/2009 | Pae et al. |
| 2010/0244005 | A1* | 9/2010 | Gyoda ............................ 257/40 |
| 2011/0057178 | A1* | 3/2011 | Shitagaki et al. ............... 257/40 |
| 2012/0241811 | A1* | 9/2012 | Kim et al. ...................... 257/100 |
| 2014/0312313 | A1* | 10/2014 | Lee et al. ........................ 257/40 |

FOREIGN PATENT DOCUMENTS

| KR | 10-0680913 | 2/2007 |
| KR | 10-2007-0035388 | 3/2007 |
| KR | 10-2009-0046536 | 5/2009 |
| KR | 10-2011-0003692 | 1/2011 |

* cited by examiner

*Primary Examiner* — Thuy Vinh Tran
(74) *Attorney, Agent, or Firm* — H.C. Park & Associates, PLC (57) ABSTRACT

An organic light emitting display device includes a substrate; a thin film transistor disposed on the substrate; and an organic light emitting component disposed on the substrate and electrically connected to the thin film transistor. The organic light emitting component includes: a first electrode; a second electrode; and an intermediate layer disposed between the first electrode and the second electrode. The organic light emitting display device further includes: a temperature sensing unit disposed on the substrate, the temperature sensing unit being configured to operate differently based on an ambient temperature of the organic light emitting display device; a power driver configured to provide power to the temperature sensing unit; and a voltage control unit configured to: determine a driving voltage of the temperature sensing unit based on the power provided to the temperature sensing unit; and determine the ambient temperature based on the driving voltage.

20 Claims, 4 Drawing Sheets

ORGANIC LIGHT EMITTING DISPLAY DEVICE INCLUDING TEMPERATURE SENSING UNIT AND METHOD OF DETERMINING AMBIENT TEMPERATURE BASED ON DRIVING VOLTAGE THEREOF

CROSS-REFERENCE TO RELATED APPLICATION

This application claims priority from and the benefit of Korean Patent Application No. 10-2013-0099244, filed on Aug. 21, 2013, which is incorporated by reference for all purposes as if set forth herein.

BACKGROUND

1. Field

Exemplary embodiments relate to an organic light emitting display device and a method of measuring a temperature using the same.

2. Discussion

An organic light emitting display device including thin film transistors (TFTs) may be used in mobile devices, such as, for example, smart phones, digital cameras, camcorders, mobile data terminals, laptops, tablet personal computers (PCs), and flexible display devices, or may be implemented in any suitable electronic device, e.g., an appliance, computer, television, workstation, etc. Conventional organic light emitting display devices typically include a substrate upon which a first electrode, a second electrode, and one or more intermediate layers disposed between the first and second electrodes are disposed. It is noted that organic light emitting display devices usually enable relatively wide viewing angles, excellent contrast, and relatively short response times. It is also noted that flexible displays may be fabricated as organic light emitting display devices. Further, driving voltages in conventional organic light emitting display devices may vary according to ambient temperature or climate conditions. In this manner, characteristics (e.g., display quality, power consumption, etc.) of an organic light emitting display device may be improved by optimizing (or otherwise adjusting) the driving voltage based on ambient temperature/climate conditions.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an organic light emitting display device configured to efficiently measure ambient temperature based on a change in voltage applied to an organic light emitting display device.

Exemplary embodiments provide a method of measuring a temperature using the organic light emitting display device.

Additional aspects will be set forth in the detailed description which follows, and, in part, will be apparent from the disclosure, or may be learned by practice of the inventive concept.

According to exemplary embodiments, an organic light emitting display device includes a substrate, a thin film transistor, an organic light emitting component, a temperature sensing unit, a power driver, and a voltage control unit. The thin film transistor is disposed on the substrate. The organic light emitting component is disposed on the substrate and electrically connected to the thin film transistor. The organic light emitting component includes a first electrode, a second electrode, and an intermediate layer disposed between the first electrode and the second electrode. The temperature sensing unit is disposed on the substrate. The temperature sensing unit is configured to operate differently based on an ambient temperature of the organic light emitting display device. The power driver is configured to provide power to the temperature sensing unit. The voltage control unit is configured to: determine a driving voltage of the temperature sensing unit based on the power provided to the temperature sensing unit; and to determine the ambient temperature based on the driving voltage.

According to exemplary embodiments, a method, includes: measuring a driving voltage across a temperature sensing unit disposed on a substrate of an organic light emitting display device, the temperature sensing unit being electrically connected to a thin film transistor; querying, based on the driving voltage, at least one memory comprising ambient temperatures stored in association with reference driving voltages; and determining an ambient temperature of the organic light emitting display device based on querying the at least one memory.

According to exemplary embodiments, a display device includes a substrate, pixels, a power driver, and a control unit. The pixels are disposed on the substrate. Each pixel includes: a thin film transistor; a first electrode electrically connected to the thin film transistor; an intermediate organic layer disposed on the first electrode; and a second electrode disposed on the intermediate organic layer. The power driver is configured to provide power to the intermediate organic layers. The control unit is configured to: measure, in response to power being provided to a first intermediate organic layer of the intermediate organic layers, a voltage drop across first and second electrodes associated with the first intermediate organic layer; and determine an ambient temperature of the display device based on the voltage drop. At least one of the intermediate organic layers includes an organic emission layer configured to emit light based on the power provided thereto.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
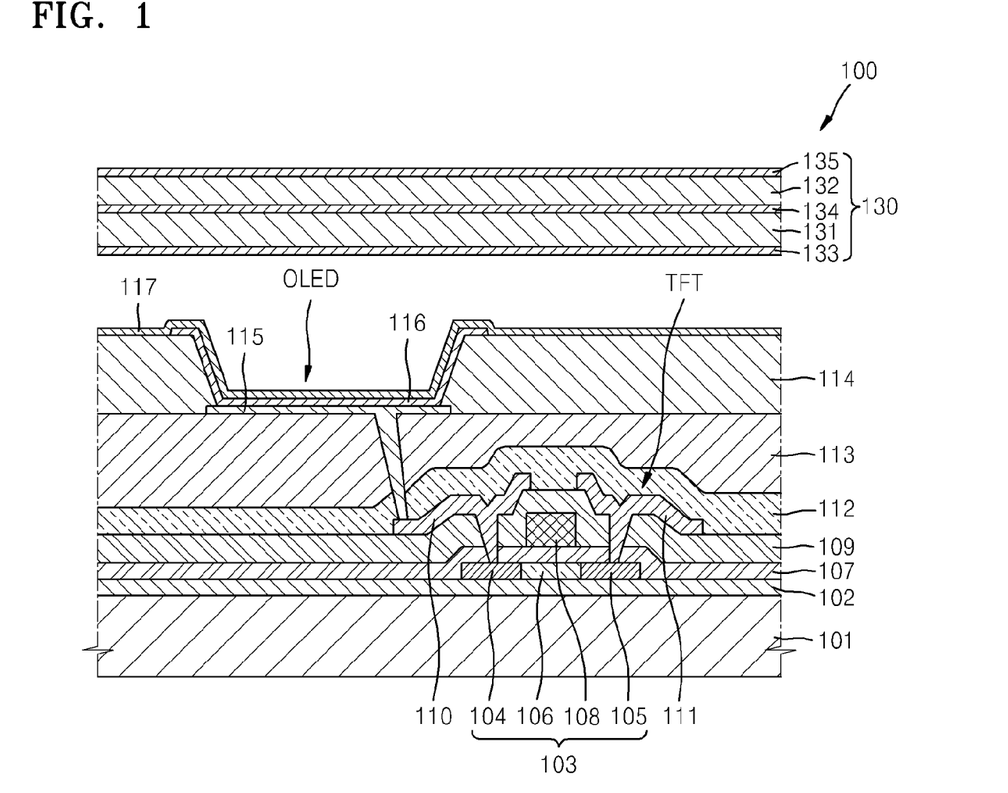
FIG. 1 is a sectional view of a sub-pixel of an organic light emitting display device, according to exemplary embodiments.
Figure 2:
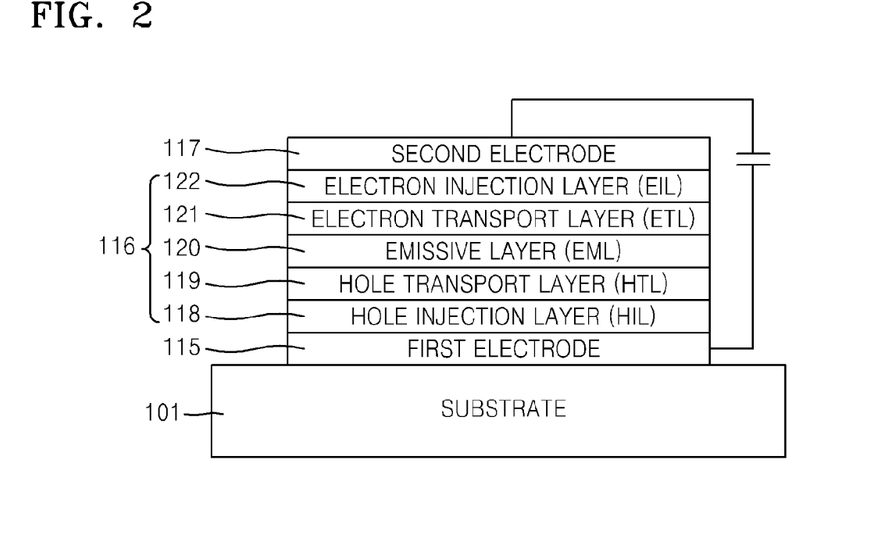
FIG. 2 is a block diagram of an organic light emitting component of the organic light emitting display device of FIG. 1, according to exemplary embodiments.

FIG. 1 is a sectional view of a sub-pixel of an organic light emitting display device, according to exemplary embodiments. FIG. 2 is a block diagram of an organic light emitting component of the organic light emitting display device of FIG. 1. It is noted that the sub-pixel of FIG. 1 is representative of a plurality of sub-pixels including as part of the organic light emitting display 100. To this end, each sub-pixel may include at least one thin film transistor TFT and at least one organic light emitting component OLED. It is contemplated, however, that each any suitable number of thin film transistors TFTs and/or organic light emitting components OLEDs may be utilized in association with exemplary embodiments described herein. For descriptive purposes, exemplary embodiments of the organic light emitting display device 100 are described in association with a flexible display device implementation; however, any other suitable type of display device implementation may be utilized in association with exemplary embodiments described herein.

Referring to FIGS. 1 and 2, the organic light emitting display device 100 may include a flexible substrate 101. The flexible substrate 101 may be formed of any suitable insulating material having flexibility. For example, the flexible substrate 101 may be formed of a polymer material, such as, for example, polyimide (PI), polycarbonate (PC), polyethersulphone (PES), polyethylene terephthalate (PET), polyethylene naphthalate (PEN), polyarylate (PAR), fiberglass reinforced plastic (FRP), etc. The flexible substrate 101 may be transparent, semi-transparent, or non-transparent.

A barrier layer 102 may be formed on the flexible substrate 101. The barrier layer 102 may completely cover the top surface of the flexible substrate 101. The barrier layer 102 may include any suitable inorganic layer, organic layer, or combination thereof. For example, the barrier layer 102 may be formed of an inorganic material, such as, for instance, silicon oxide ($SiO_x$), silicon nitride ($SiN_x$), silicon oxynitride (SiON), aluminium oxide (AlO), aluminium oxynitride (AlON), etc., an organic material, such as, for instance, acryl, polyimide, polyester, etc., and/or any suitable combination thereof. The barrier layer 102 may be formed as a single layer or a multi-layer structure. In exemplary embodiments, the barrier layer 102 may be utilized to block (or otherwise prevent/reduce) oxygen, moisture, and/or other contaminants from permeating through the flexible substrate 101. The barrier layer 103 may also provide a flat (or substantially flat) surface on the flexible substrate 101, e.g., function as a planarization layer.

A thin film transistor TFT may be formed on the barrier layer 102. Although a top gate type thin film transistor TFT is shown in FIG. 1, it is contemplated that any other suitable type of thin film transistor may be utilized, such as a bottom gate type thin film transistor TFT, etc. In exemplary embodiments, the thin film transistor TFT may include a semiconductor active layer 103 formed on the barrier layer 102. If the semiconductor active layer 103 is formed of polysilicon, amorphous silicon may be formed, crystallized, and, thereby, transformed into polysilicon. Amorphous silicon may be crystallized using any of various methods including, for example, rapid thermal annealing (RTA), solid phase crystallization (SPC), eximer laser annealing (ELA), metal induced crystallization (MIC), metal induced lateral crystallization (MILC), sequential lateral solidification (SLS), etc.

It is noted that, in accordance with a flexible substrate 101 implementation, a method of formed semiconductor active layer 103 that does not involve a substantially high-temperature heating operation may be used. For example, when performing crystallization in a relatively low temperature polysilicon (LTPS) process, a laser beam may be radiated for a short period of time to activate the semiconductor active layer 103 to minimize the period of time that the flexible substrate 101 is exposed to a high temperature, e.g., a temperature equal to or above 450° C. As such, the semiconductor active layer 103 may be formed on the flexible substrate 101 including, for example, a polymer material. In exemplary embodiments, a source region 104 and a drain region 105 may be formed in the semiconductor active layer 103 by implanting, for instance, N-type impurity ions or P-type impurity ions therein. A region between the source region 104 and the drain region 105 may be a channel region 106 that may not be doped with an impurity.

Alternatively, the semiconductor active layer 103 may be formed of an oxide semiconductor. For example, the oxide semiconductor may include an oxide of a metal ion selected from among Group XII metal ions, Group XIII metal ions, and/or Group XIV metal ions, such as, for example, zinc (Zn), indium (In), gallium (Ga), tin (Sn), cadmium (Cd), germanium (Ge), hafnium (Hf), etc., or a combination thereof.

As seen in FIG. 1, a gate insulation layer 107 may be formed on the semiconductor active layer 103. The gate insulation layer 107 may include any suitable inorganic material, such as, for example, silicon oxide ($SiO_x$), silicon nitride ($SiN_x$), etc., or a metal oxide. In this manner, the gate insulation layer 107 may be a single layer structure or a multi-layer structure.

A gate electrode 108 may be formed on a region of the gate insulation layer 107, such as, for example, over the channel region 106 of the semiconductor active layer 103. The gate electrode 108 may be a single layer or multilayer structure including any suitable conductive material, such as, for example, gold (Au), silver (Ag), copper (Cu), nickel (Ni), platinum (Pt), palladium (Pd), aluminium (Al), molybdenum (Mo), neodymium (Nd), chromium (Cr), tungsten (W), etc., or a combination thereof, e.g., aluminium-neodymium (Al—Nd), molybdenum-tungsten (Mo—W), etc. An interlayer insulation layer 109 may be formed on the gate electrode 108. The interlayer insulation layer 109 may be formed of any suitable insulation inorganic material, such as, for example, silicon oxide ($SiO_x$), silicon nitride ($SiN_x$), etc., any suitable insulation organic material, or a combination thereof.

In exemplary embodiments, a source electrode 110 and a drain electrode 111 may be formed on the interlayer insulation layer 109. Contact holes may be formed in the gate insulation layer 107 and the interlayer insulation layer 109 by selecting removing portions thereof. In this manner, the formation of the source electrode 110 on the interlayer insulation layer 109 may allow the source electrode 110 to be electrically connected to the source region 104 via a first contact hole. Further, the formation of the drain electrode 111 on the interlayer insulation layer 109 may allow the drain electrode 111 to be electrically connected to the drain region 105 via a second contact hole.

A passivation layer 112 may be formed on the source electrode 110 and the drain electrode 111. The passivation layer 112 may be formed of any suitable inorganic material, such as, for example, silicon oxide ($SiO_x$), silicon nitride ($SiN_x$), etc., any suitable organic material, or any suitable combination thereof. A planarizing layer 113 may be formed on the passivation layer 112. The planarizing layer 113 may include any suitable organic material, such as, for instance, acryl, polyimide, benzocyclobutene (BCB), etc.

According to exemplary embodiments, an organic light emitting component OLED may be formed above the thin film transistor TFT, e.g., formed on the planarization layer 113. For example, a first electrode 115 corresponding to a pixel electrode may be electrically connected to either the source electrode 110 or the drain electrode 111 of the thin film transistor TFT via a third contact hole extending through the planarization layer 113 and the passivation layer 112. The first electrode 115 may function as an anode of the organic light emitting component OLED and may be formed of any suitable materials. To this end, the first electrode 115 may be formed as a transparent electrode, a reflective electrode, etc. For example, the first electrode 115 may include aluminium zinc oxide (AZO), gallium zinc oxide (GZO), indium tin oxide (ITO), indium zinc oxide (IZO), zinc oxide (ZnO), indium(III) oxide ($In_2O_3$), etc., when the first electrode 115 is formed as a transparent electrode. It is also contemplated that one or more conductive polymers (ICP) may be utilized, such as, for example, polyaniline, poly(3,4-ethylenedioxythiophene) poly(styrenesulfonate) (PEDOT:PSS), etc. When the first electrode 115 is formed as a reflective electrode, a reflective layer may be formed of silver (Ag), magnesium (Mg), aluminium (Al), platinum (Pt), palladium (Pd), gold (Au), nickel (Ni), neodymium (Nd), iridium (Ir), chromium (Cr), etc., or a compound thereof. To this end, a layer of aluminium zinc oxide (AZO), gallium zinc oxide (GZO), indium tin oxide (ITO), indium zinc oxide (IZO), zinc oxide (ZnO), indium(III) oxide ($In_2O_3$), etc., may be formed thereon. Again, it is also contemplated that one or more conductive polymers (ICP) may be utilized.

A pixel defining layer (PDL) 114 may formed on the planarizing layer 113 to cover edge portions of the first electrode 115. The PDL 114 may define a light emitting region of each sub-pixel by surrounding the first electrode 115. In exemplary embodiments, the PDL 114 may be formed of any suitable organic material, inorganic material, or a combination thereof. For example, the PDL 114 may be formed of an organic material, such as acryl, polyimide, benzocyclobutene (BCB), etc., an inorganic material, such as silicon nitride ($SiN_x$), etc., or a combination thereof. To this end, the PDL 114 may be formed as a single layer or a multilayer structure.

An intermediate layer 116 may be formed on a portion of the first electrode 115 that is exposed by partially etching the PDL 114. The intermediate layer 116 may be formed via any suitable manufacturing technique, e.g., a deposition-based technique. As seen in FIG. 1, the intermediate layer 116 is patterned to correspond to each sub-pixel, e.g., the patterned first electrode 115. It is contemplated, however, that any other suitable configuration of the intermediate layer 116 may be utilized in association with exemplary embodiments described herein. To this end, the intermediate layer 116 may be formed of any suitable organic monomer material or an organic polymer material.

Adverting to FIG. 2, when the intermediate layer 116 is formed of an organic monomer material, a hole injection layer (HIL) 118, a hole transport layer (HTL) 119, an emissive layer (EML) 120, an electron transport layer (ETL) 121, and an electron injection layer (EIL) 122 may be formed on the first electrode 115. The organic monomer material may be formed via any suitable manufacturing technique, such as, for instance, a vacuum-based deposition technique. When the intermediate layer 116 is formed of an organic polymer material, the intermediate layer 116 may include a HTL and an EML. The organic polymer material may be formed via any suitable manufacturing technique, such as, for instance, a screen printing or inkjet printing-based technique.

Referring back to FIG. 1, a second electrode 117 corresponding to, for instance, a common electrode of the organic light emitting component OLED may be formed on the intermediate layer 116. The second electrode 117 may be formed of any suitable material, such as one or more of the materials utilized to form the first electrode 115. To this end, the second electrode 117 may be formed as a transparent electrode, a reflective electrode, etc. The first electrode 115 and the second electrode 117 are insulated from each other via the intermediate layer 116. As such, when voltages are applied to the first electrode 115 and the second electrode 117, a visible ray(s) may be emitted by the intermediate layer 116. In this manner, an image may be presented via the sub-pixel, which may be recognized by an observer.

In exemplary embodiments, when the second electrode 117 is formed as a transparent electrode, a metal having relatively small work function, such as, for example, lithium (Li), calcium (Ca), lithium fluoride/calcium (LiF/Ca), lithium fluoride/aluminium (LiF/Al), aluminium (Al), magnesium (Mg), etc., or a compound thereof, may be deposited on the intermediate layer 116. An electrode formed of any suitable transparent electrode forming material, such as, for instance, aluminium zinc oxide (AZO), gallium zinc oxide (GZO), indium tin oxide (ITO), indium zinc oxide (IZO), zinc oxide (ZnO), indium(III) oxide ($In_2O_3$), etc., or an ICP, may be formed thereon. When the second electrode 117 is formed as a reflective electrode, the second electrode 117 may be formed by depositing, for example, lithium (Li), calcium (Ca), lithium fluoride/calcium (LiF/Ca), lithium fluoride/aluminium (LiF/Al), aluminium (Al), magnesium (Mg), etc., or a compound thereof, on the intermediate layer 116.

According to exemplary embodiments, when the first electrode 115 is formed as a transparent electrode or a reflective electrode, the first electrode 115 may be formed having a shape corresponding to shape of an opening of a sub-pixel. The second electrode 117 may be formed by depositing a transparent electrode or a reflective electrode throughout (or substantially throughout) a display region. It is noted, however, that the second electrode 117 may not be deposited throughout a display region, but formed in any suitable pattern. Locations of the first electrode 115 and the second electrode 117 may be switched.

As seen in FIG. 1, an encapsulation 130 may be formed on the organic light emitting component OLED, e.g., formed on the second electrode 117. The encapsulation 130 may protect the intermediate layer 116 and other thin film layers from external moisture, oxygen, and/or other contaminants. The encapsulation 130 may include a structure in which at least one organic layer and at least one inorganic layer are stacked upon one another. For example, the encapsulation 130 may have a structure in which at least one set of organic layers 131 and 132 formed of, for instance, epoxy, polyimide, polyethylene terephthalate (PET), polycarbonate (PC), polyethylene, polyacrylate, etc., and at least one set of inorganic layers 133, 134, and 135 formed of, for instance, silicon oxide ($SiO_x$), silicon nitride ($SiN_x$), aluminium oxide ($Al_xO_y$), titanium oxide ($TiO_x$), zirconium oxide ($ZrO_x$), zinc oxide (ZnO), etc., are stacked. It is also contemplated that the encapsulation 130 may have a structure in which at least one of the organic layers 131 and 132 and at least two of the inorganic layers 133, 134, and 135 are stacked. The topmost inorganic layer (e.g., inorganic layer 135) of the encapsulation 130, which may be exposed to an ambient environment) may be formed of an inorganic material. In this manner, the topmost inorganic layer may prevent permeation of moisture, oxygen, and/or other contaminants to the organic light emitting component OLED.

According to exemplary embodiments, the driving voltage of the organic light emitting display device 100 may vary according to changes in ambient temperature or climate conditions. The ambient temperature may be determined by measuring the driving voltage of the organic light emitting display 100 and comparing the measured driving voltage to a reference voltage. The reference voltage may be stored in a memory of or accessible to the organic light emitting display device 100. To this end, the reference voltage may be a previously measured driving voltage or may be set by, for instance, a manufacturer, a user, etc., of the organic light emitting display device 100. The reference voltage may be associated with a corresponding ambient temperature or climate condition that may be utilized to control at least one aspect of the organic light emitting display device 100.

In exemplary embodiments, a sensing unit (not shown) configured to sense (or otherwise determine) a temperature, e.g., a resistance temperature detector (RTD), may be arranged in (or otherwise coupled to) the organic light emitting display device 100. In this manner, an internal temperature of the organic light emitting display device 100 may be measured using the sensing unit. Power voltage applied to the organic light emitting display device 100 may be adjusted based on one or more of the measured temperatures.

It is noted, however, that since one or more devices and/or thin film layers may be formed on the flexible substrate 101 using polymer materials, it may be difficult to form such devices and/or thin film layers on the flexible substrate 101 due to the size of a temperature sensing unit and/or due to relatively high temperature operations utilized to form inorganic layers (e.g., at or above 300° C.). According to exemplary embodiments, a thin film temperature sensing unit may be fabricated on the flexible substrate 101 using one or more relatively low temperature manufacturing techniques, which may also be the same processes utilized to form the organic light emitting component OLED. In this manner, the thin film temperature sensing unit and the organic light emitting component OLED may be simultaneously formed.

Figure 3:
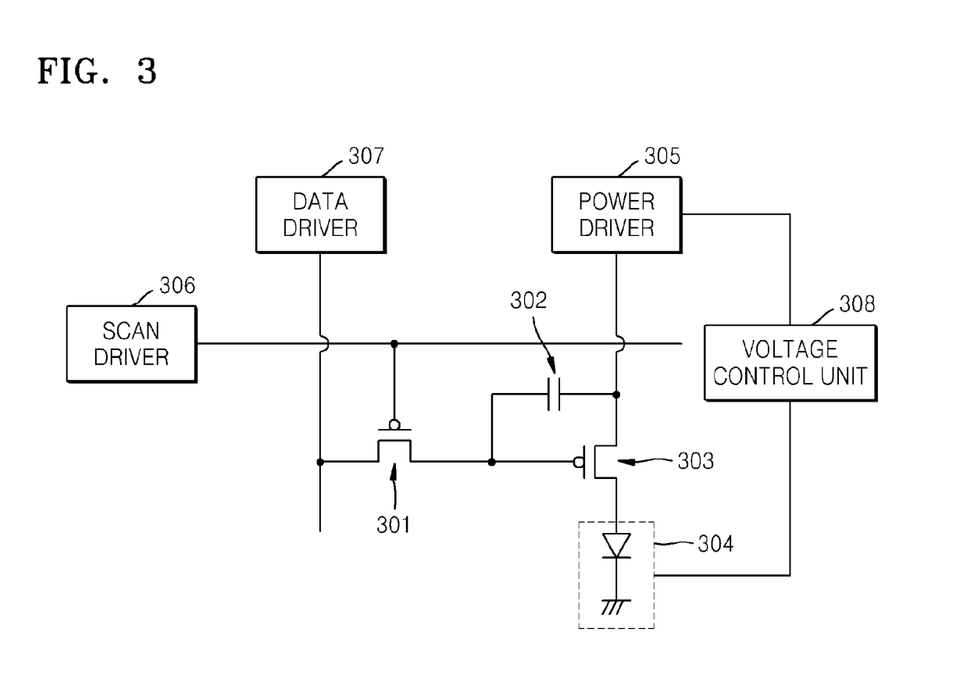
FIG. 3 is a circuit diagram of a temperature sensing unit of the organic light emitting display device of FIG. 1, according to exemplary embodiments.

FIG. 3 is a circuit diagram of a temperature sensing unit of the organic light emitting display device 100 of FIG. 1, according to exemplary embodiments.

Referring to FIG. 3, a circuit utilized to drive the organic light emitting display device 100 may include a plurality of thin film transistors (TFTs), such as first TFT 301 and second TFT 303, at least one capacitor 302, and a plurality of drivers (e.g., power driver 305, data driver 307, and scan driver 306). The circuit may include at least one organic light emitting component 304 and a voltage control unit 308.

According to exemplary embodiments, the gate electrode of the first TFT 301, which may correspond to a switching TFT, may be connected to the scan driver 306, whereas a first (e.g., source) electrode of the first TFT 301 may be connected to the data driver 307. A second (e.g., drain) electrode of the second TFT 303, which may correspond to a driving TFT, may be connected to an organic light emitting component 304, whereas a first (e.g., source) electrode of the second TFT 303 may be connected to the power driver 305. A second (e.g., drain) electrode of the first TFT 301 may be connected to the gate electrode of the second TFT 303. The capacitor 302 may be interconnected between the power driver 305 and the gate electrode of the second TFT 303.

In exemplary embodiments, the first TFT 301 may be driven based on a scan signal applied to the gate electrode of the first TFT 301 by the scan driver 306. The first TFT 301 may transmit a data signal applied by the data driver 307 to the gate electrode of the second TFT 303. The second TFT 303 may provide an amount of a current to flow into the organic light emitting component 304 based on a voltage difference between the gate electrode and the first electrode of the second TFT 303. In this manner, the voltage difference may be based on the data signal transmitted to the gate electrode of the second TFT 303 via the first TFT 301. A constant current having a constant amount may be provided to the organic light emitting component 304. The capacitor 302 may be configured to store the data signal transmitted via the first TFT 301 for a single frame.

According to exemplary embodiments, the driving voltage applied to the organic light emitting component 304 may vary in accordance with the variance of an ambient temperature. In other words, the mobilities of carriers for holes and electrons are temperature-dependant in an intermediate layer (e.g., intermediate layer 116) that is disposed between a first electrode (e.g., first electrode 115) and a second electrode (e.g., second electrode 117) of the organic light emitting component 304. As such, the organic light emitting component 304 may not only function as a light emitting component, but may also function as a temperature sensing device, as will become more apparent below.

Figure 4:
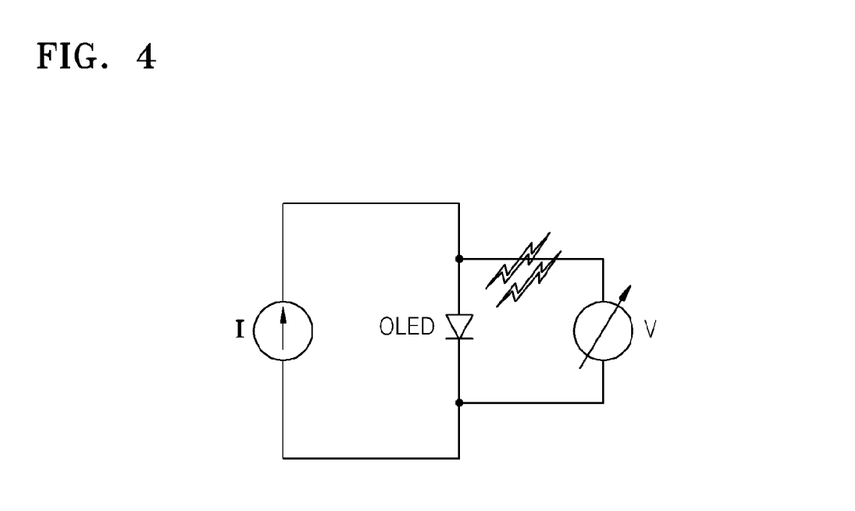
FIG. 4 is a diagram schematically illustrating a temperature being measured using the temperature sensing unit of FIG. 3, according to exemplary embodiments.
Figure 5:
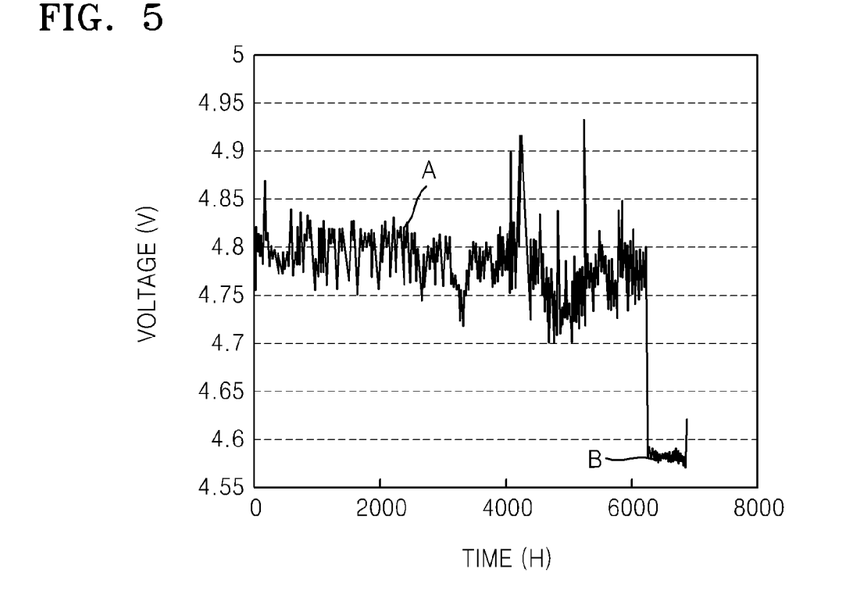
FIG. 5 is a graph of a relationship between driving voltage of the organic light emitting component of the organic light emitting display device of FIG. 1 and ambient temperatures, according to exemplary embodiments.

FIG. 4 is a diagram schematically illustrating a temperature being measured using the temperature sensing unit of FIG. 3, according to exemplary embodiments. FIG. 5 is a graph of a relationship between driving voltage of the organic light emitting component of the organic light emitting display device of FIG. 1 and ambient temperatures, according to exemplary embodiments.

As shown in FIG. 4, ambient temperature may be determined by driving an organic light emitting component OLED using the same current as a current source I and measuring voltages at opposite ends of the organic light emitting component OLED. When changes in the driving voltage under a constant current are measured, the ambient temperature may be inversely proportional to the driving voltage as shown in Table 1 and FIG. 5.

TABLE 1

| Outside Temperature (° C.) | Driving Voltage (V) |
|---|---|
| 30° C. | 4.8 V |
| 50° C. | 4.6 V |

Referring to Table 1 and FIG. 5, the driving voltage may be relatively stable at room temperature (e.g., 30° C.), as illustrated in FIG. 5 at point A, during a continuous current time. The change in driving voltage may be measured by raising the ambient temperature to 50° C., as illustrated in FIG. 5 at point B, after 6,000 hours have passed. The above-noted measurements were made utilizing a relatively highly reliable red pixel. In this manner, the temperature of a substrate on which an organic light emitting component OLED is formed may be determined using a correlation between the ambient temperature and driving voltage.

Figure 6:
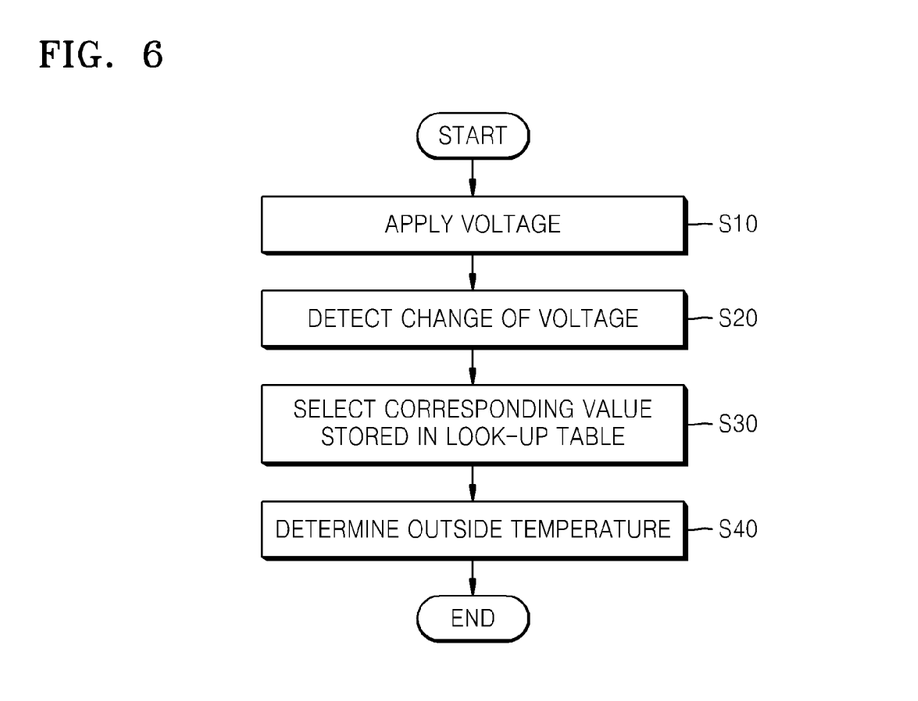
FIG. 6 is a flowchart of a process to determine a temperature of the organic light emitting display device of FIG. 1, according to exemplary embodiments.

FIG. 6 is a flowchart of a process to determine a temperature of the organic light emitting display device of FIG. 1, according to exemplary embodiments. It is noted that the process of FIG. 6 is described in association with FIGS. 1 through 5.

A power voltage having a constant amount is applied to the second TFT 303, such that a constant current having a constant amount may be supplied to the organic light emitting component OLED (operation S10). As the organic light emitting component OLED emits light, mobilities of carriers for holes and electrons of the organic light emitting component OLED may change as the ambient temperature changes. The change in the voltage applied to the organic light emitting component OLED may be determined (e.g., measured) and the change in value may be provided to a voltage control unit 308 (operation S20).

In exemplary embodiments, the voltage control unit 308 may select (or determine) a corresponding temperature value stored in a look-up table based on data of the look-up table regarding the voltage applied to the OLED. The voltage control unit 308 may provide the temperature value to the power driver 305 (operation S30). As such, the ambient temperature may be determined based on the change in driving voltage (operation S40).

According to exemplary embodiments, the ambient temperature may be determined based on one or more relationships among voltage, current, and brightness of the organic light emitting component OLED. In this manner, the ambient temperature may be determined by maintaining application of a constant current, a constant voltage, and a constant brightness, and measuring changes in one or more from among other measured values dependent on the ambient temperature. When the ambient temperature is determined, characteristics of the organic light emitting display device 100, e.g., brightness uniformity and driving characteristics, may be improved by controlling intensity of a power voltage supplied from the power driver 305 to the sub-pixels.

Although exemplary embodiments have been described in association with determining the ambient temperature according to a change in driving voltage using an organic light emitting component of a sub-pixel as a temperature sensing unit, it is also contemplated that that the ambient temperature may be determined (e.g., measured) by fabricating a pixel, in which a temperature sensing device is formed separately from image presenting pixels (e.g., red, green, blue, white, etc.)

pixels of the organic light emitting display device 100. This configuration is described in more detail in association with FIG. 7.

Figure 7:
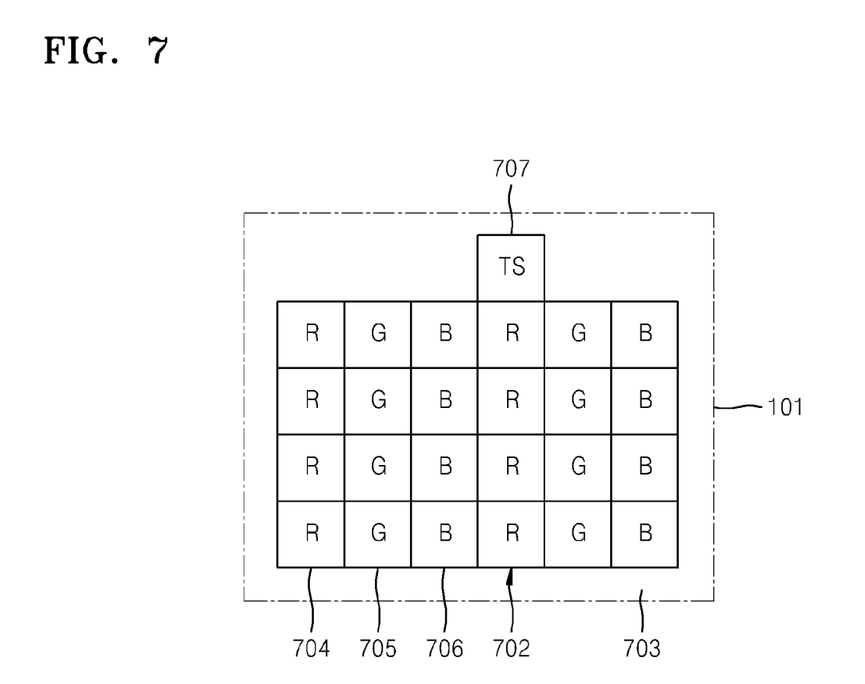
FIG. 7 is a block diagram of a temperature sensing unit, according to exemplary embodiments.

FIG. 7 is a block diagram of a temperature sensing unit, according to exemplary embodiments.

Referring to FIG. 7, a display region 702, in which sub-pixels emitting light of different colors are arranged in a pattern, and a non-display region 703 disposed outside the display region 702, may be formed on the flexible substrate 101. The display region 702 may include, for instance, red sub-pixels 704, green sub-pixels 705, and blue sub-pixels 706, which may be successively arranged in a pattern. In exemplary embodiments, a unit pixel may include a plurality of sub-pixels 704 through 706, where the plurality of sub-pixels 704 through 706 may emit light of various colors. For example, the plurality of sub-pixels 704 through 706 may include the sub-pixels 704 through 706 emitting red, green, and blue lights. It is contemplated, however, that the plurality of sub-pixels 704 through 706 may emit any suitable combination of colors, such as, for example, red, green, blue, and white light.

In exemplary embodiments, the plurality of sub-pixels 704 through 706 may include intermediate layers including EMLs emitting lights of various colors. For example, a plurality of sub-pixels includes intermediate layers including EMLs emitting red, green, and blue lights, respectively. It is also contemplated that the plurality of sub-pixels 704 through 706 may emitting light of various colors by including intermediate layers (which, in turn, include EMLs) configured to emit light of the same color, e.g., white light, and may include color converting layers or color filters to convert the white light into various colors of light, e.g., red, green, blue, etc.

For example, an intermediate layer configured to emit white light may have any of various suitable structures, e.g., a structure in which at least an emissive material emitting red light, an emissive material emitting green light, and an emissive material emitting blue light are stacked. As another example, an intermediate layer configured to emit white light may have a structure in which at least an emissive material emitting red light, an emissive material emitting green light, and an emissive material emitting blue light are mixed. To this end, the red light, the green light, and the blue light are examples. As such, exemplary embodiments may utilize any color of light. In other words, as long as white light may be emitted, any of various color combinations other than the combination of red, green, and blue may be utilized.

As seen in FIG. 7, a sub-pixel 707 in which a temperature sensing device may be formed may be formed in the non-display region 703. The red, green, and blue sub-pixels 704 through 706 may be formed in the display region 702. Further, it is noted that the sub-pixel 707, in which a temperature sensing device is formed, may not emit light.

According to exemplary embodiments, the sub-pixel 707 (in which a temperature sensing device is formed) may include a first temperature sensing electrode corresponding to a first electrode (e.g., first electrode 115) of an organic light emitting component OLED and a second temperature sensing electrode corresponding to a second electrode (e.g., second electrode 117) of the organic light emitting component OLED. In this manner, at least one thin film layer from among the thin film layers of the intermediate layer (e.g., intermediate layer 116) of the organic light emitting component OLED may be arranged between the first temperature sensing electrode and the second temperature sensing electrode. The thin film layer may have the same structure as the first electrode 115, the second electrode 117, or the intermediate layer 116 of the organic light emitting component OLED of FIG. 1. As such, to avoid obscuring exemplary embodiments described and illustrated herein, the thin film layer is not shown in FIG. 7.

In exemplary embodiments, because the sub-pixel 707 in which a temperature sensing device is formed may not emit light, an EML (e.g., EML 120) arranged in the intermediate layer 116 may not be included as part of sub-pixel 707. As long changes in driving voltage may be determined based on changes in carrier mobility due to, for instance, changes in ambient temperature, the sub-pixel 707 in which a temperature sensing device is formed may include at least one from among the HIL 118, the HTL 119, the ETL 121, and the EIL 122. It is noted that the sub-pixel 707 in which a temperature sensing device is formed may be formed simultaneously with the formation of at least one of the first electrode 115, the second electrode 117, and the intermediate layer 116 of the organic light emitting component OLED formed on the flexible substrate 101.

According to exemplary embodiments, a temperature sensing unit may be formed on a flexible substrate at relatively low temperatures to form an organic light emitting display device. In this manner, exemplary embodiments provide for a method to measure or otherwise determine the ambient temperature using the temperature sensing unit. To this end, knowledge of the ambient temperature may be utilized by the organic light emitting display device to optimize (or otherwise improve) one or more aspects of the organic light emitting display device, e.g., brightness uniformity, driving characteristics, power consumption, etc.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An organic light emitting display device, comprising:
   a substrate;
   a thin film transistor disposed on the substrate;
   an organic light emitting component disposed on the substrate and electrically connected to the thin film transistor, the organic light emitting component comprising:
      a first electrode;
      a second electrode; and
      an intermediate layer disposed between the first electrode and the second electrode;
   a temperature sensing unit disposed on the substrate, the temperature sensing unit being configured to operate based on an ambient temperature of the organic light emitting display device;
   a power driver configured to provide power to the temperature sensing unit; and
   a voltage control unit configured to:
      determine a driving voltage of the temperature sensing unit based on the power provided to the temperature sensing unit; and
      determine the ambient temperature based on the driving voltage.

2. The organic light emitting display device of claim 1, wherein the temperature sensing unit comprises:
   a first temperature sensing electrode;
   a second temperature sensing electrode; and
   a thin film layer disposed between the first temperature sensing electrode and the second temperature sensing electrode.

3. The organic light emitting display device of claim 2, wherein:
the first temperature sensing electrode corresponds to the first electrode;
the second temperature sensing electrode corresponds to the second electrode; and
the thin film layer comprises at least one layer from among layers of the intermediate layer.

4. The organic light emitting display device of claim 3, wherein the layers of the intermediate layer comprise:
a hole injection layer;
a hole transport layer;
an emissive layer;
an electron transport layer; and
an electron injection layer.

5. The organic light emitting display device of claim 1, wherein the temperature sensing unit is formed in a non-display region of the substrate.

6. The organic light emitting display device of claim 1, wherein:
the organic light emitting component is one of a plurality of organic light emitting components corresponding to pixels disposed in a display region of the substrate; and
the temperature sensing unit corresponds to at least one of the plurality of organic light emitting components.

7. The organic light emitting display device of claim 1, further comprising:
at least one memory configured to store ambient temperature values in association with reference driving voltage values,
wherein the voltage control unit is configured to query the at least one memory with a value corresponding to the driving voltage to determine the ambient temperature.

8. The organic light emitting display device of claim 7, wherein the ambient temperature values are inversely proportional to the driving voltage values.

9. The organic light emitting display device of claim 7, wherein a constant current is applied to the temperature sensing unit.

10. The organic light emitting display device of claim 9, wherein the voltage control unit is configured to measure a voltage drop across the temperature sensing unit to determine the driving voltage.

11. The organic light emitting display device of claim 1, wherein the substrate is a flexible substrate.

12. A method, comprising:
measuring a driving voltage across a temperature sensing unit disposed on a substrate of an organic light emitting display device, the temperature sensing unit being electrically connected to a thin film transistor;
querying, based on the driving voltage, at least one memory comprising ambient temperatures stored in association with reference driving voltages;
determining an ambient temperature of the organic light emitting display device based on querying the at least one memory.

13. The method of claim 12, wherein the temperature sensing unit comprises:
a first temperature sensing electrode corresponding to a first electrode of an organic light emitting component of the organic light emitting display device;
a second temperature sensing electrode corresponding to a second electrode of the organic light emitting component; and
a thin film layer disposed between the first temperature sensing electrode and the second temperature sensing electrode, the thin film layer corresponding to at least one layer of an intermediate layer of the organic light emitting component, the intermediate layer being disposed between the first electrode and the second electrode.

14. The method of claim 13, further comprising:
applying a constant current to the temperature sensing unit.

15. The method of claim 12, wherein the temperature sensing unit is disposed outside a display region of the organic light emitting display device.

16. A display device, comprising:
a substrate;
pixels disposed on the substrate, each pixel comprising:
a thin film transistor;
a first electrode electrically connected to the thin film transistor;
an intermediate organic layer disposed on the first electrode; and
a second electrode disposed on the intermediate organic layer;
a power driver configured to provide power to the intermediate organic layers; and
a control unit configured to:
measure, in response to power being provided to a first intermediate organic layer of the intermediate organic layers, a voltage drop across first and second electrodes associated with the first intermediate organic layer; and
determine an ambient temperature of the display device based on the voltage drop,
wherein at least one of the intermediate organic layers comprises an organic emission layer configured to emit light based on the power provided thereto.

17. The display device of claim 16, wherein:
the pixel comprising the first intermediate organic layer is disposed in a display area of the substrate; and
the first intermediate organic layer corresponds to the at least one intermediate organic layer.

18. The display device of claim 16, wherein the pixel comprising the first intermediate organic layer is disposed outside a display area of the substrate.

19. The display device of claim 16, further comprising:
at least one memory configured to store ambient temperature values in association with reference voltage drop values,
wherein the control unit is configured to query the at least one memory with a value corresponding to the voltage drop to determine the ambient temperature.

20. The display device of claim 16, wherein the control unit is further configured to adjust the power provided to at least one of the intermediate organic layers based on the ambient temperature.

* * * * *